United States Patent [19]

Sugimura

[11] Patent Number: 5,734,702
[45] Date of Patent: Mar. 31, 1998

[54] TELEPHONE CARD WITH COMMERCIAL INFORMATION AND A TELEPHONE CONNECTION METHOD THEREFOR

[75] Inventor: Yuichi Sugimura, Kawasaki, Japan

[73] Assignee: Fujitsu Limited, Kanagawa, Japan

[21] Appl. No.: 151,521

[22] Filed: Nov. 12, 1993

[30] Foreign Application Priority Data

Nov. 12, 1992 [JP] Japan .................................. 4-302523

[51] Int. Cl.[6] .................................................. H04M 15/00
[52] U.S. Cl. ........................... 379/88; 379/91.01; 379/144
[58] Field of Search ........................... 379/72, 84, 87, 379/67, 88, 89, 144, 91, 112, 132, 357, 91.01

[56] References Cited

U.S. PATENT DOCUMENTS 4,850,007  7/1989  Marino ........................ 379/67
4,916,731  4/1990  Brisson ........................ 379/96
5,007,077  4/1991  Fields .......................... 379/67

FOREIGN PATENT DOCUMENTS 627251   1/1987  Japan .
1115262  5/1989  Japan .

Primary Examiner—Krista Zele
Assistant Examiner—Daniel S. Hunter
Attorney, Agent, or Firm—Helfgott & Karas, P C

[57] ABSTRACT

A telephone card has a part for storing the cumulative number of charged calls and a part for storing commercial information to be presented through a telephone set. The commercial information may be voice data to be played through a handset or speaker of the telephone set, and/or character or image data to be displayed on a display of the telephone set. When a card is inserted, the telephone set determines whether or not commercial information is present on the card. When commercial information is present, it is output before normal dialing can occur. When no commercial information is on the card, the telephone set is immediately connected for normal dialing.

10 Claims, 4 Drawing Sheets

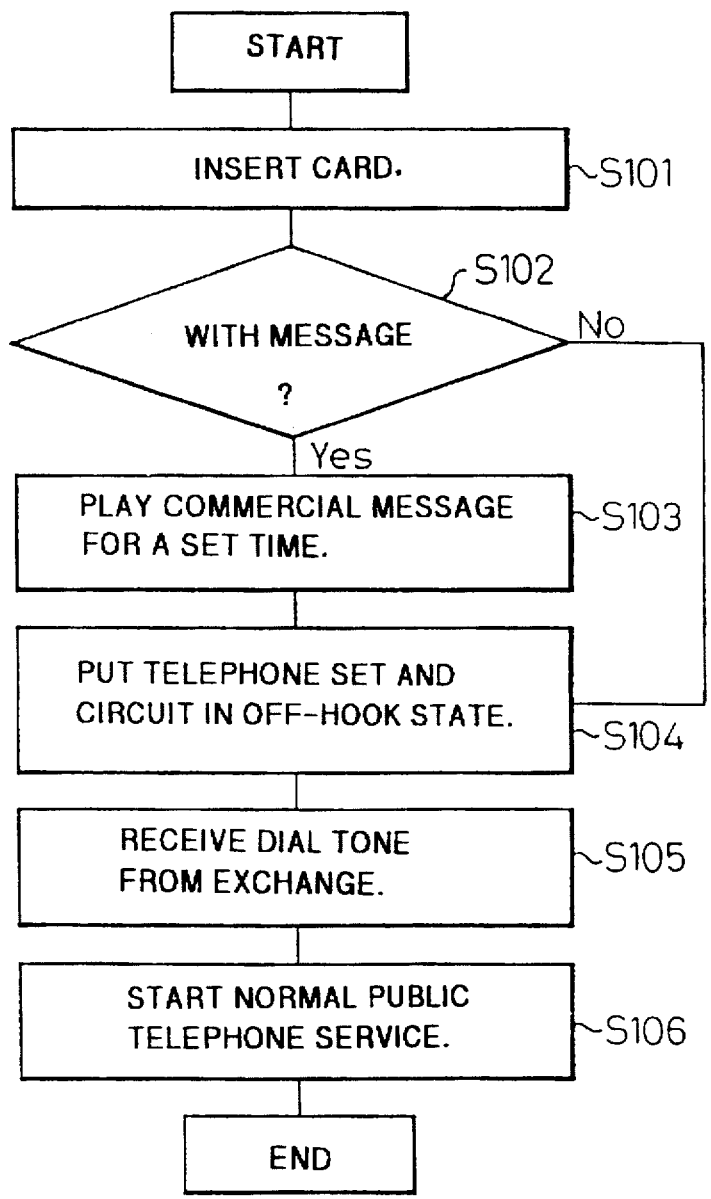

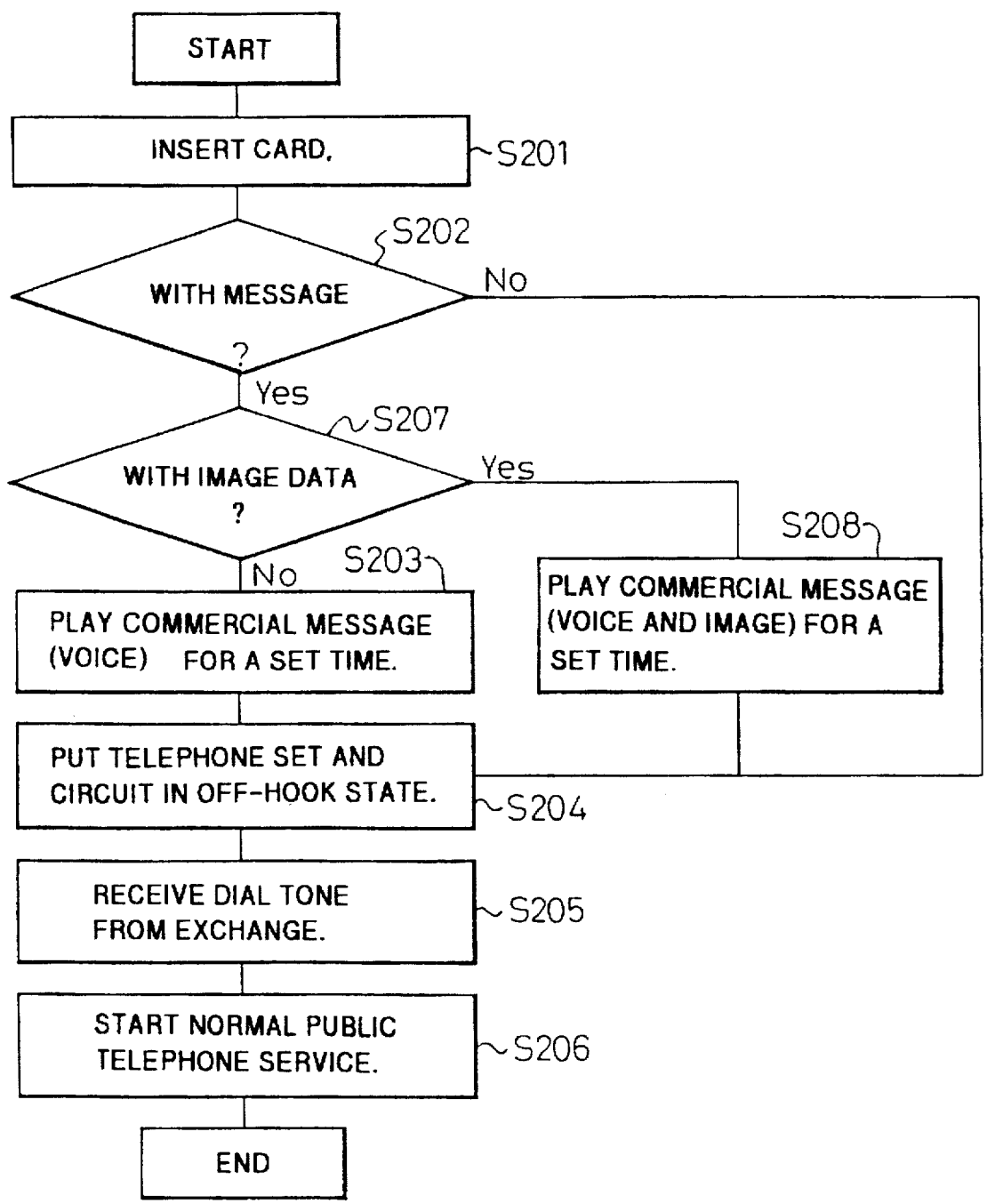

TELEPHONE CARD WITH COMMERCIAL INFORMATION AND A TELEPHONE CONNECTION METHOD THEREFOR

BACKGROUND OF THE INVENTION

1. Field of the Invention

The present invention relates to a telephone card and a public telephone connection method for the card. In particular, the present invention relates to a telephone card recorded with a sponsor's voice or video commercial and a telephone connection method for the card.

2. Description of the Related Art

Public telephones had been operated only with coins before telephone cards were introduced. The telephone cards rapidly spread due to their convenience and economy. In these days, most public telephones accept telephone cards. When one frequently uses public telephones, makes a long-distance call on a public telephone, or talks for a long time on a public telephone, the telephone cards are particularly convenient because they are easy to carry and require no coins to be carried or to be successively inserted into the telephone.

When a user makes a long distance call or talks for a long time on a public telephone, the user may be most interested in the telephone charge.

In postal service for example, sponsors sometimes bear part of postal charges, or low-priced postal cards with commercial messages are marketed. The telephone communications service, however, provides no such economy service to meet user's needs.

SUMMARY OF THE INVENTION

An object of the present invention is to provide a telephone card having a sponsor's commercial voice message, or a sponsor's commercial image message to be displayed on a simple display such as a liquid crystal display installed in a telephone set. When the telephone card is used to make a call, the commercial voice or image is played. A user may purchase this kind of telephone card at low prices because the sponsors bear some part of the telephone charges.

Another object of the present invention is to provide a telephone connection method for a telephone card having a sponsor's commercial information.

A telephone card according to the present invention has a part for storing the cumulative number of charged calls and a part for storing commercial information to be presented through a telephone set. The commercial information may be voice data to be played through a handset or speaker of the telephone set, and/or character or image data to be displayed on a display of the telephone set.

A telephone connection method for a telephone card with commercial information according to the present invention includes a first step of providing a telephone with the commercial information out of the telephone card when the card is inserted into the telephone and a second step of carrying out a usual dialing connection after the commercial information is completely provided. A telephone connection method for a telephone contains according to the present invention includes the steps of determining whether or not the telephone card has commercial information as soon as the card is inserted into a telephone, presenting the commercial information if the card has it, and carrying out a usual dialing connection if the card has no commercial information, or if the commercial information has been completely presented.

Like a standard telephone card, the charged call storage part of the telephone card according to the present invention cumulatively stores 50 to 100 accounting pulses sent from an exchange. The commercial information storage part of the telephone card stores commercial information such as a sponsor's voice data or simple image data. When a user inserts the telephone card into a public telephone, the user will at first hear or see the commercial information stored. After the commercial information is completely played, a usual dialing connection is carried out. In the case of a standard telephone card, it is confirmed that it has no commercial information, and a usual dialing connection is carried out at once.

BRIEF DESCRIPTION OF THE DRAWINGS

The present invention will be more clearly understood from the description as set forth below with reference to the accompanying drawings wherein:

FIG. 3 is a flowchart showing an example (1) of a telephone connection method for the telephone card with commercial information according to the present invention.

FIG. 4 is a flowchart showing an example (2) of a telephone connection method for the telephone card with commercial information according to the present invention.

DESCRIPTION OF THE PREFERRED EMBODIMENTS

Figure 1:
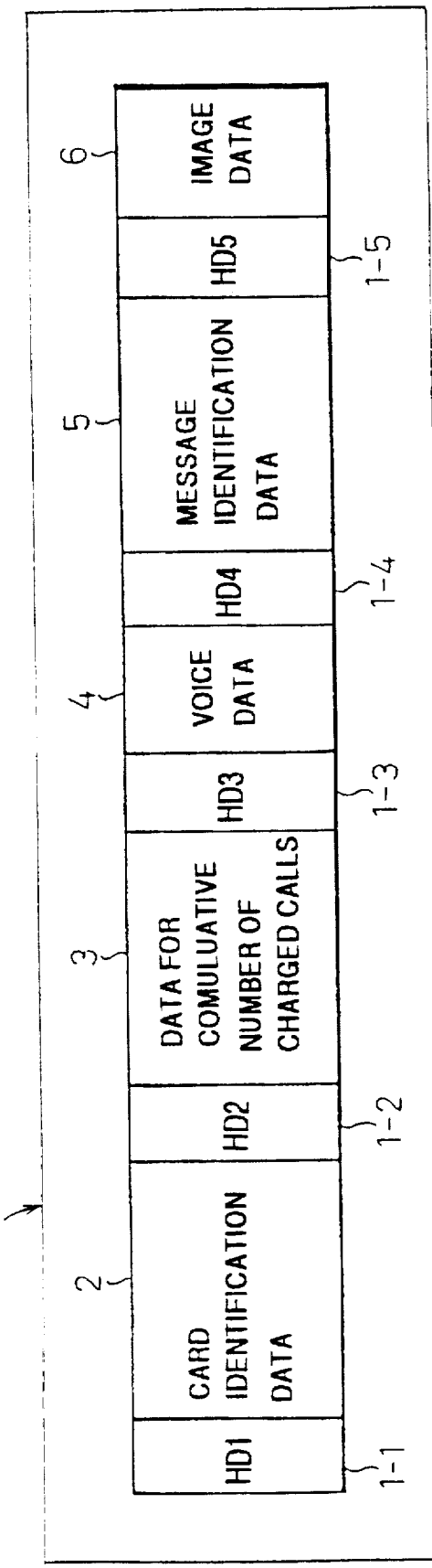
FIG. 1 is a model of a data format for a telephone card with commercial information according to the present invention.

FIG. 1 shows an example of a data format employed by a telephone card with commercial information according to the present invention.

Data blocks 2 to 6 have headers (HD1 to HD5) 1-1 to 1-5, respectively. Each of the headers contains, for example, preamble data used for detecting a head position in the data block, data block length data, and error check data.

The card identification data block 2 contains read-only data including a flag indicating whether or not the card is valid and a flag indicating whether or not the card stores commercial information. The accounting data block 3 contains read/write data indicating the number of calls allowed for the card. In response to an accounting pulse sent from an exchange to a public telephone during a call, the number of the allowed calls is decremented by one from an initial number such as 50 or 100. The voice data block 4 stores a sponsor's commercial message. For example, a voice commercial of several seconds to several tens of seconds is stored in the voice data block 4 with use of a voice data compression technique. The message identification data block 5 stores a read-only flag indicating whether or not image commercial information is stored. The image data block 6 stores sponsor's commercial images in a predetermined image format.

Figure 2:
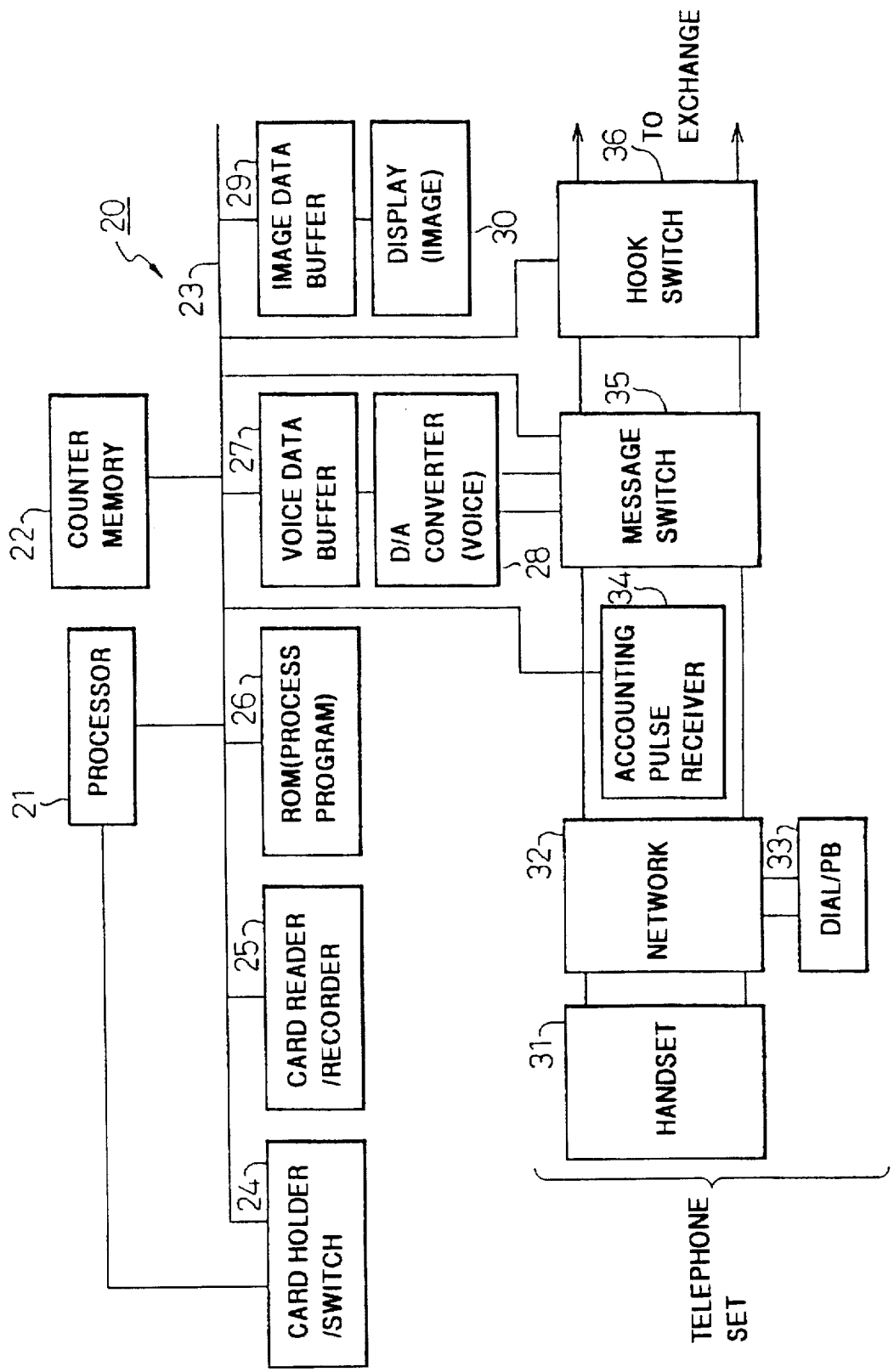
FIG. 2 is a block diagram showing a public telephone that accepts the telephone card according to the present invention.

FIG. 2 is a block diagram showing an example of a public telephone 20, which accepts the telephone card with commercial information according to the present invention. To accept the telephone card with commercial information according to the present invention, the public telephone 20 has, in addition to components of a conventional public telephone, a voice data buffer 27, a D/A converter 28, a message switch 35, an image data buffer 29, and a display 30. The embodiment of FIG. 2 is based on a conventional analog public telephone. Since an ISDN digital public telephone originally incorporates these additional parts, the digital public telephone will accept the telephone card with commercial information according to the present invention if proper functions are allocated therefor, the capacity thereof is restudied, and simple circuits are added thereto.

Each block in the upper part of FIG. 2 directly relates to the telephone card according to the present invention, and blocks in the lower part thereof form a telephone circuit. Operations of the blocks will be explained in detail.

A user picks up a handset 31 and inserts the telephone card into a card holder, to turn ON system power. In the case of a standard public telephone, an exchange sends a dial tone (DT) to enable the user to dial. The telephone according to this embodiment will take the following procedures.

A card holder/switch 24 detects that the telephone card was inserted and informs a processor 21 of the fact. The processor 21 examines a hook switch 36 through a common bus 23, to see whether or not the handset 31 is off the hook. If the handset 31 is on the hook, the processor 21 instructs the card holder/switch 24 to eject the card. The processor 21 drives a card reader/recorder 25 to read card identification data out of the block 2 shown in FIG. 1 and the cumulative number of charged calls out of the accounting data block 3. According to the read data, the processor 21 detects the headers HD1 and HD2 shown in FIG. 1. If the headers are not normally detected, the processor 21 determines that there is a data error and ejects the card. If the processor determines according to the card identification data that the card is invalid, or according to the cumulative number of charged calls that no calls are allowed, the processor ejects the card.

If it is determined that the headers HD1 and HD2 are normal, that the card is valid according to the card identification data, and that the card is eligible to make some calls according to the accounting data, the processor determines according to the card identification data whether or not the card contains commercial information. If the card is a standard one with no commercial information, the processor controls the message switch 35 through the common bus 23, to connect the handset 31 to a circuit. At the same time, the processor controls the hook switch 36 to close a circuit loop and inform the exchange of the off-hook state.

Thereafter, usual telephone connection procedures are carried out. The user hears a dial tone sent by the exchange through the handset 31 and starts dialing. The exchange periodically sends accounting pulses during the call. The accounting pulses are received by an accounting pulse receiver 34 disposed in the telephone 20. In response to the accounting pulses, the card reader/recorder 25 updates the accounting data stored in the telephone card. A dial/PB circuit 33 generates a dial pulse or a push button signal. A network circuit 32 controls the volume of transmitted or received voice and terminates the circuit.

If the processor 21 determines according to the card identification data that the telephone card has commercial information, and according to the accounting data, and that the card is allowed to make some calls, the processor drives the card reader/recorder 25 to read the voice data block 4 and header HD3 of FIG. 1 and transfers the read data to the voice data buffer 27. The processor 21 controls the message switch 35 through the common bus 23 so that the D/A converter 28 is connected to the handset 31. The D/A converter 28 converts digital data stored in the voice data buffer 27 into analog data. Consequently, the user hears a voice message through the handset 31. At the same time, the processor 21 sets a message data length stored in the header HD3 in a counter memory 22. As the voice message is played, the count in the memory is decremented word by word, to monitor the end of the voice message.

The image related data 1-4, 5, 1-5, and 6 of FIG. 1 are processed similar to the voice data. Namely, if it is determined according to image data identification data in the message identification data block 5 that there is image data, the processor drives the card reader/recorder 25 to read the image data out of the image data block 6 and transfers the same to the image data buffer 29. The display 30 successively processes and displays the transferred image data.

When the counter memory 22 informs the processor 21 of the end of the commercial message, the processor 21 controls the message switch through the common bus 23, to connect the handset 31 to the hook switch 36. The hook switch 36 closes the circuit loop to establish a normal transmission state to the exchange. When the switch 36 detects that the handset is on the hook, this detected state is informed to the processor through the common bus 23 or through an interrupt process, and the processor 21 drives the card holder/switch 24 to eject the card.

FIGS. 3 and 4 are flowcharts schematically showing the connection method explained with reference to FIG. 2 for the telephone set that accepts the telephone card according to the present invention. FIG. 4 differs from FIG. 3 in that it includes steps of displaying image data.

In FIG. 3, step S101 confirms that a card is inserted. Step S102 determines whether or not the card is of the present invention. If it is the card according to the present invention, step S103 presents a sponsor's commercial message. After the presentation of the message, or if the step S102 determines that the card is a standard telephone card, step S104 closes a circuit loop to put the telephone set in an off-hook state. In step S105, an exchange sends a dial tone. In step S106, a user hears the dial tone through a handset and starts dialing.

FIG. 4 includes, in addition to the steps of FIG. 3, an image data decision step S207 and an image data display step S208. The other steps of FIG. 4 are the same as those of FIG. 3. Namely, steps S201 to S206 correspond to the steps S101 to S106 of FIG. 3. Accordingly, they will not be explained again. The step S207 determines whether or not there is image data. If there is, the step S208 presents the image data and accompanying voice data. In this embodiment, image data accompanies voice data.

As explained above, the present invention provides a telephone card having commercial information. The commercial information may be a sponsor's voice message, or a sponsor's video commercial to be displayed on a simple display such as a liquid crystal display installed in a telephone set. When a user uses the card for making a call, the user must hear or see the commercial.

Accordingly, for a sponsor, the card provides a commercial effect comparative to a television commercial. For a user, the card is cheeper than a standard one, as compensation for the commercial. If one is in a hurry, he or she may use a standard telephone card having no commercial. If one makes a long-distance call, or talks for a long time on a phone, or makes a non-urgent call, he or she may use the telephone card according to the present invention. In this way, one may select the normal and commercial recorded telephone cards as occasion demands, to make good use of the cheaper telephone cards.

I claim:

1. A telephone connection method for use with a telephone card, comprising the steps:

inserting said telephone card in a telephone set;

determining, after the telephone card is inserted into said telephone set, whether or not the telephone card has commercial information, if said telephone card has commercial information, providing said telephone set with said commercial information taken from said telephone card;

presenting at said telephone set said commercial information if the telephone card has said commercial information; and carrying out a usual dialing connection operation and being connected after said commercial information is completely presented.

2. A telephone connection method for a telephone card with commercial information according to claim 1, wherein said telephone set is provided with said commercial information in the on-hook condition of said telephone set.

3. A telephone connection method for a telephone card with commercial information according to claim 1, wherein said presented commercial information is a sponsor's voice message to be played through a handset or speaker of a telephone set.

4. A telephone connection method for a telephone card with commercial information according to claim 1, wherein said presented commercial information is a sponsor's image message to be displayed on a display of the telephone set.

5. A telephone connection method for a telephone card with commercial information according to claim 1, wherein said presented commercial information is a sponsor's voice message to be played through a handset or speaker of a telephone set, and a sponsor's image message to be displayed on a display of the telephone set.

6. A telephone set accepting a telephone card with commercial information, comprising:

a telephone circuit including a handset, circuit network, dialing circuit, accounting pulse receiver, and hook switch;

means for insertion of said telephone card in said telephone set;

card holding means for detecting that said telephone card was inserted;

means for determining, after the telephone card is inserted into said telephone set, whether or not the telephone card has commercial information, and if said telephone card has commercial information, for providing said telephone set with said commercial information read out from said telephone card;

card reading means for reading out said commercial information when said commercial information is contained in the telephone card;

voice data buffering means for storing digital voice data when read out of said commercial information in a predetermined message format;

digital to analog converting means for converting said digital voice data, provided by said voice data buffering means, to an analog voice signal;

message switching means for switching a handset connection to either a line or an output of said digital to analog converting means;

means for presenting at said telephone set said commercial information if the telephone card has said commercial information;

means for carrying out a usual dialing connection operation and for being connected after said commercial information is completely presented; and control means for directing said commercial information stored in said telephone card to said card reading means, and for determining after said telephone card is inserted into said telephone set, whether or not the telephone card has commercial information, and for presenting completely at said telephone set the commercial information when the telephone card has commercial information, and thereafter beginning operation of a usual dialing connection operation.

7. A telephone set according to claim 6, further including:

image data buffering means for storing image data read out of said commercial information in a predetermined image format; and display means for presenting an image given by said image data, which is provided by said image data buffering means, on a screen.

8. A telephone set according to claim 6, wherein said presented commercial information is a sponsor's voice message to be played through said handset or speaker of said telephone set.

9. A telephone set according to claim 7, wherein said said presented commercial information is a sponsor's image message to be displayed on a display of the telephone set.

10. A telephone set accepting a telephone card with commercial information comprising:

inserting means for inserting by a user said telephone card in a telephone set determining means in said telephone set for determining, after the telephone card is inserted into said telephone set, by detecting a flag on said card, whether or not the telephone card has commercial information, and if said telephone card has commercial information providing said telephone set with said commercial information taken from said telephone card;

presenting means for presenting to said user at said telephone set said commercial information if the telephone card has said commercial information; and carrying out means for carrying out a usual dialing connection operation requested by said user and for being connected after said commercial information is completely presented.

\* \* \* \* \*